United States Patent [19]

Schutten et al.

[11] Patent Number: 5,546,294
[45] Date of Patent: Aug. 13, 1996

[54] RESONANT CONVERTER WITH WIDE LOAD RANGE

[75] Inventors: Michael J. Schutten, Schenectady; Vlatko Vlatkovic, Niskayuna; Robert L. Steigerwald, Burnt Hills, all of N.Y.

[73] Assignee: General Electric Company, Schenectady, N.Y.

[21] Appl. No.: 506,312

[22] Filed: Jul. 24, 1995

[51] Int. Cl.$^6$ ................................................. H02M 3/335
[52] U.S. Cl. .......................... 363/17; 363/98; 363/132
[58] Field of Search .......................... 363/17, 95, 98, 363/131, 132

[56] References Cited

U.S. PATENT DOCUMENTS

| | | | |
|---|---|---|---|
| 4,916,599 | 4/1990 | Traxler et al. | 363/65 |
| 4,992,919 | 2/1991 | Lee et al. | 363/17 |
| 5,267,138 | 11/1993 | Shores | 363/98 |
| 5,479,337 | 12/1995 | Voigt | 363/131 |

Primary Examiner—Peter S. Wong
Assistant Examiner—Bao Q. Vu
Attorney, Agent, or Firm—Jill M. Breedlove; Marvin Snyder

[57] ABSTRACT

Low-power auxiliary circuitry is added to a resonant converter for providing high efficiency operation, low EMI, and tight output voltage control over a wide load range. There is an auxiliary circuit corresponding to each half-bridge connection of main switching devices, each auxiliary circuit including a half-bridge connection of auxiliary switching devices with the junction therebetween coupled to the junction between the main switching devices of the corresponding half-bridge. Under heavy load conditions, sufficient energy is stored in the main resonant inductor to commutate the junctions joining the main switching devices in the resonant converter, resulting in zero-voltage switching for the main switching devices. Under light load conditions, a phase shift is introduced between the corresponding main and auxiliary switching devices, and the auxiliary resonant inductor currents are increased to a level sufficient for the sum of the main resonant inductor current and the corresponding auxiliary resonant inductor current to provide zero-voltage switching for all the bridge switching devices.

8 Claims, 7 Drawing Sheets fig. 1

RESONANT CONVERTER WITH WIDE LOAD RANGE

FIELD OF THE INVENTION

The present invention relates generally to power converters and, more particularly, to a resonant converter with auxiliary circuitry for achieving high efficiency operation over a wide load range.

BACKGROUND OF THE INVENTION

Loss of zero-voltage switching capability (i.e., switching active switching devices with substantially zero voltage thereacross) at light load conditions in a resonant converter (e.g., a series resonant converter or a phaseshifted series resonant converter) leads to a significant increase in switching losses, excessive generation of electromagnetic interference (EMI), and problems in controlling output voltage. These problems are typically solved by adding one or more reactive components to the resonant circuit for storing some reactive energy. Disadvantageously, however, such an approach significantly changes the control characteristics of the converter such that the converter control is very complex and results in a loss of output voltage control. Furthermore, the additional reactive energy is circulated through the converter at heavy loads, leading to an increase in conduction losses and a reduction in efficiency. Many systems in which a resonant converter would be very useful are intolerant of high EMI and excessive heat generation, and require very precise voltage control under wide load variations. Accordingly, it is desirable to provide a resonant converter capable of providing low EMI, tight output voltage control, and high efficiency over a wide load range.

SUMMARY OF THE INVENTION

In accordance with the present invention, low-power auxiliary circuitry is added to a resonant converter for providing high efficiency operation, low EMI, and tight output voltage control over a wide load range. The resonant converter comprises a full-bridge or half-bridge connection of main switching devices, each switching device having a snubber capacitor and an antiparallel diode coupled thereacross, and a resonant circuit coupled to the main switching devices. There is an auxiliary circuit corresponding to each half-bridge connection of main switching devices, each auxiliary circuit comprising a half-bridge connection of auxiliary switching devices with the junction theretween coupled through an auxiliary resonant inductance to the junction between the main switching devices of the corresponding half-bridge. Under heavy load conditions, sufficient energy is stored in the main resonant inductor to commutate the junctions joining the main switching devices in the resonant converter, resulting in zero-voltage switching (ZVS) for the main switching devices. Under light load conditions, a phase shift is introduced between the corresponding main and auxiliary switching devices, and the auxiliary resonant inductor currents are increased to a level sufficient for the sum of the main resonant inductor current and the corresponding auxiliary resonant inductor current to provide ZVS for all the bridge switching devices. Advantageously, therefore, the resonant converter operates with high efficiency and low EMI over a wide load range, and allows phase-shifted pulse width modulation and frequency control over a wide load range without loss of ZVS capability. As an additional advantage, the control characteristics of the resonant converter are unaltered.

BRIEF DESCRIPTION OF THE DRAWINGS

The features and advantages of the present invention will become apparent from the following detailed description of the invention when read with the accompanying drawings in which.

DETAILED DESCRIPTION OF THE INVENTION

Figure 1:
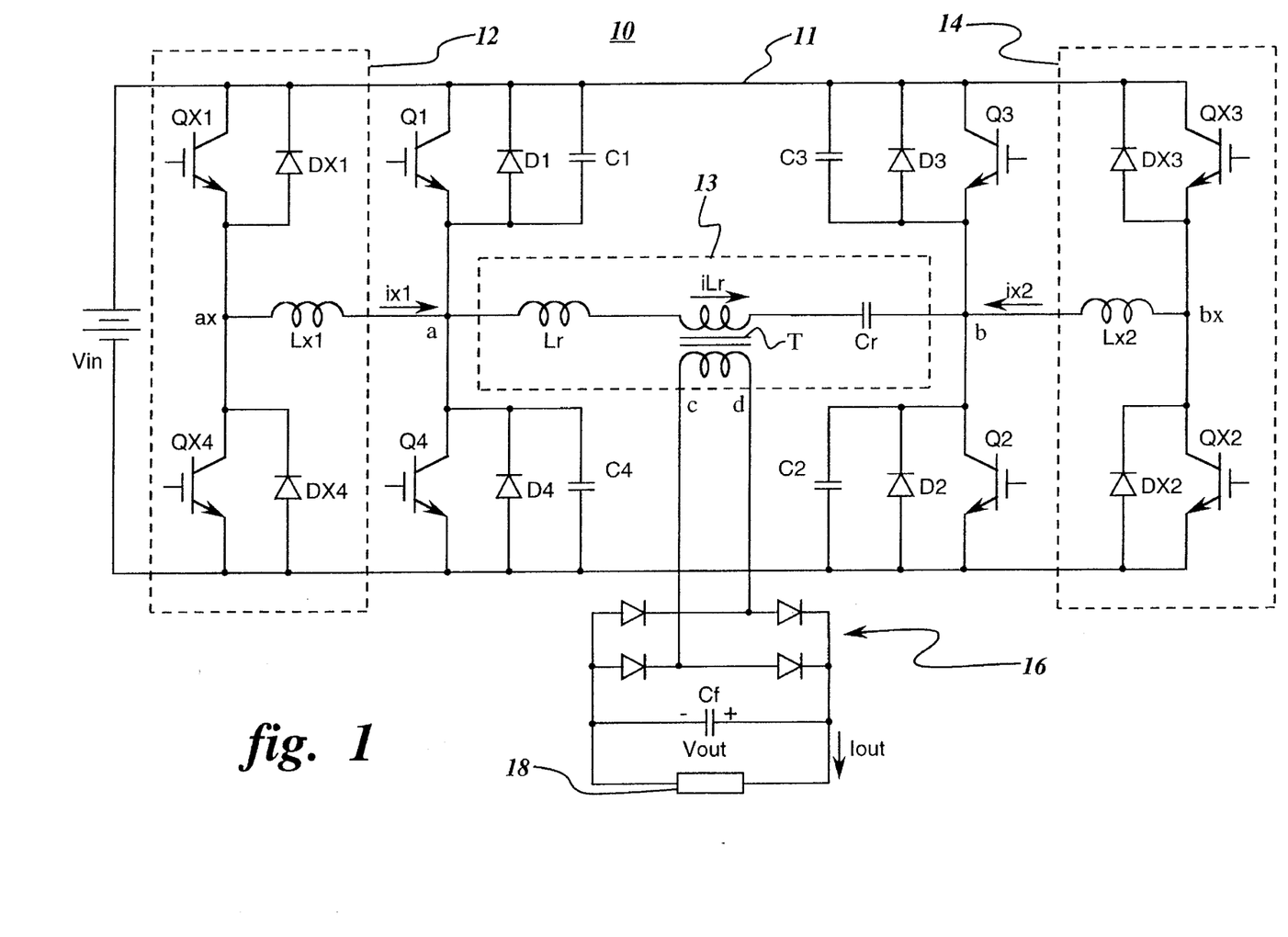
FIG. 1 schematically illustrates a resonant converter, including a series resonant circuit, with auxiliary circuitry in accordance with the present invention.

FIG. 1 illustrates a resonant converter 10 with auxiliary circuits 12 and 14 according to the present invention. The resonant converter 10 comprises a conventional resonant converter 11 comprising main switching devices Q1, Q2, Q3 and Q4 connected as shown in a full-bridge configuration, each switch having a snubber capacitor C1–C4, respectively, and an antiparallel diode (which may be an integral device) D1–D4, respectively, coupled thereacross. The resonant converter 11 comprises a resonant circuit 13, which is illustrated in FIG. 1 as a series resonant circuit with a resonant capacitor Cr and a resonant inductor Lr connected in series with a load (coupled through transformer T) between junctions a and b joining the switching devices of each half-bridge, Q1 and Q4, and Q3 and Q2, respectively. The load circuit is connected to the secondary winding of transformer T at points c and d, as shown, and comprises a parallel connection of a full-wave rectifier 16, a filter capacitor Cf, and a load 18.

Figure 2A:
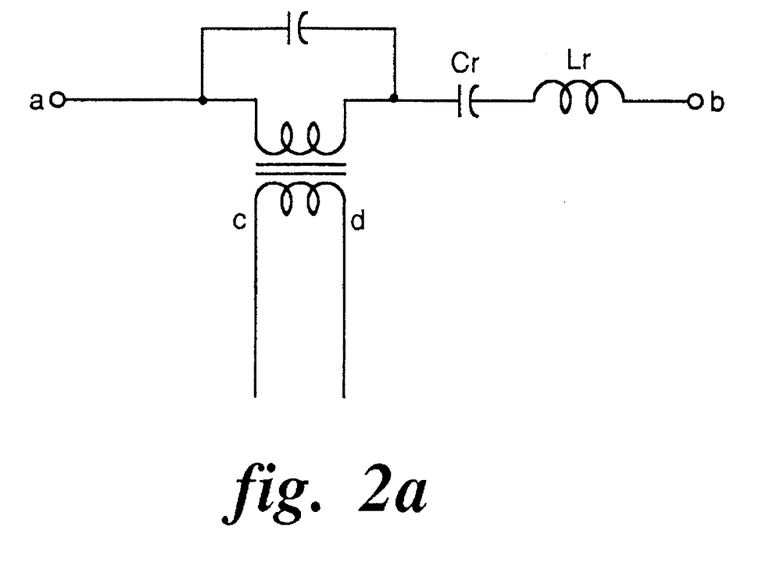
FIGS. 2A and 2B schematically illustrate a series/parallel resonant circuit and a parallel resonant circuit, respectively, which may be used as alternatives to the series resonant circuit of FIG. 1 in accordance with the present invention.
Figure 2B:
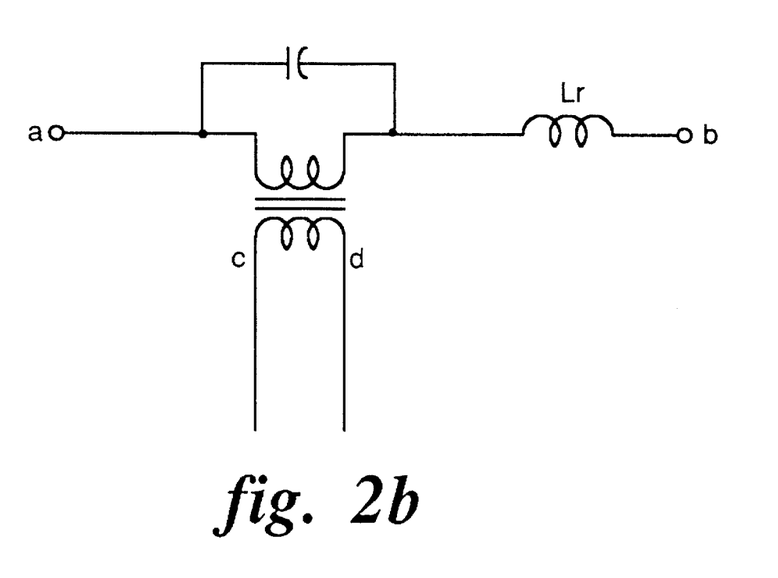

A series resonant converter is illustrated in FIG. 1 by way of example only since the principles of the present invention apply equally to other types of resonant circuits, including, for example, a series/parallel resonant circuit and a parallel resonant circuit, as illustrated in FIGS. 2A and 2B, respectively.

There are basically two conventional resonant converter control methods. The more common of the two is switching frequency control. The problem with switching frequency control is that, at light loads, output voltage control can only be maintained if the switching frequency is increased to very high values (which is usually not practicable in the series resonant converter of FIG. 1).

The second conventional type of control useful in a full-bridge resonant converter is phase-shifted pulse width modulation (PSPWM) wherein the switching frequency is fixed, but the phase shift between the two half-bridges is varied. In this way, the pulse width of the voltage between junctions a and b is modified to effectively provide output voltage control by PWM. Using this control method, the output voltage control is theoretically maintained even at a no-load condition by operating both half-bridges in phase (i.e., Q1 and Q3 switch simultaneously, and Q4 and Q2 switch simultaneously, so that v(a,b)=0). The main problem of PSPWM control is loss of zero-voltage switching (ZVS) at light loads. When ZVS is lost, switching losses increase and excessive EMI is generated. In addition, the control characteristics of the converter are influenced by parasitic oscillations caused by hard switching.

In accordance with the present invention, the problems of the conventional resonant converter control methods, described hereinabove, are overcome by adding auxiliary circuitry. In particular, for the full-bridge resonant converter of FIG. 1, two auxiliary circuits 12 and 14 are added. Each auxiliary circuit comprises a half-bridge connection of low-current auxiliary switching devices Qx1–Qx4 and Qx3–Qx2, respectively; the junction between the switching devices of each auxiliary half-bridge is connected through an auxiliary inductor Lx1 and Lx2, respectively, to a corresponding one of the junctions a and b, respectively, between the main switching devices Q1–Q4 and Q3–Q2, respectively, of the series resonant converter. Auxiliary diodes DX1, DX2, DX3 and DX4 are shown as being coupled in an antiparallel relationship with auxiliary switching devices QX1, QX2, QX3 and QX4, respectively. Advantageously, the current rating of the auxiliary components is typically significantly less than the current rating (e.g., less than 10%) of the main switching devices and resonant inductor in the series resonant converter.

Figure 3:
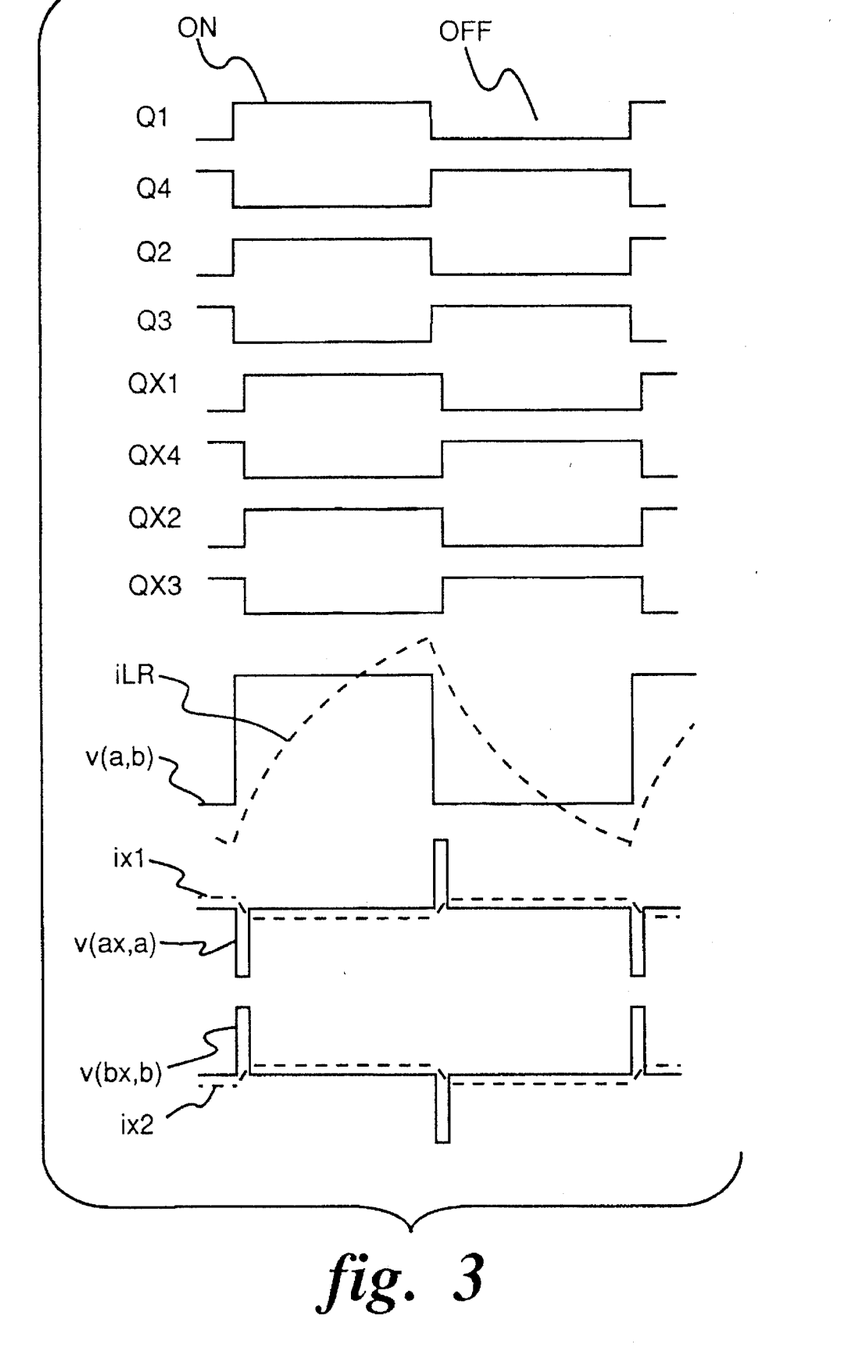
FIG. 3 graphically illustrates gate drive signals and voltage and current waveforms for the series resonant converter of FIG. 1 operating under heavy load conditions.

FIG. 3 illustrates gate drive signals for switching devices Q1–Q4 and Qx1–Qx4 and converter waveforms for a series resonant converter with auxiliary circuitry in accordance with the present invention, such as that of FIG. 1, under heavy load conditions. The main bridge voltage v(a,b) and the resonant inductor current waveforms are the same as for a conventional series resonant converter. At heavy loads, there is plenty of energy stored in the resonant inductor Lr, and this energy is used to commutate nodes a and b in resonant fashion, thus providing ZVS operation for switching devices Q1–Q4. The auxiliary inductor currents ix1 and ix2 are controlled by controlling the phase shifts between the corresponding main and auxiliary switching devices, i.e., the phase shifts between Q1 and Qx1, Q2 and Qx2, Q3 and Qx3, and Q4 and Qx4, respectively. If, for example, there is no phase shift between the main and auxiliary switching devices, the voltages v(a,ax) and v(b,bx) are zero so that ix1=ix2=0. Under heavy load conditions, the auxiliary inductor currents ix1 and ix2 are kept at a very low level, typically below 2% of the resonant inductor current and are sufficient only to commutate the nodes ax and bx and provide ZVS conditions for the auxiliary switching devices.

Figure 4:
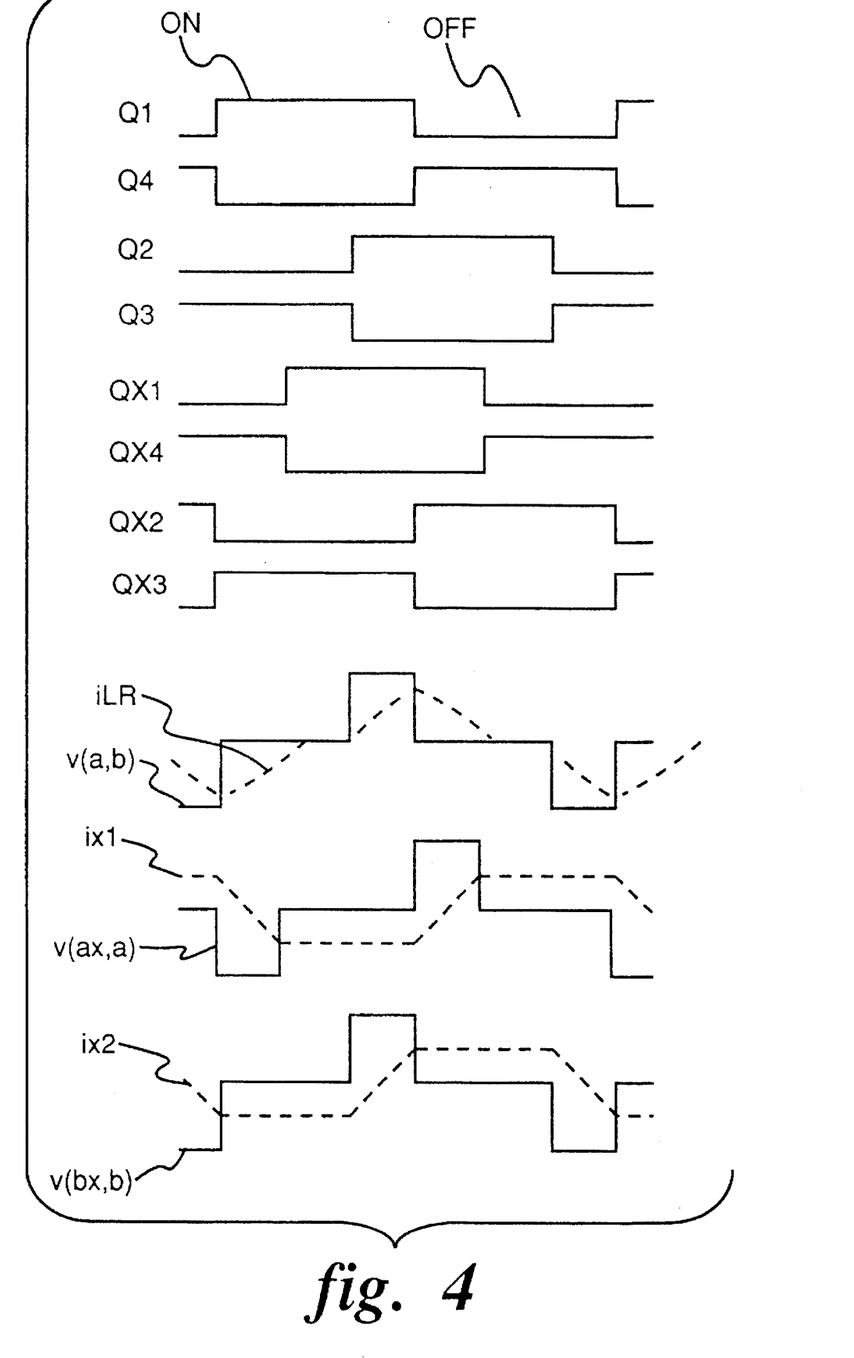
FIG. 4 graphically illustrates gate drive signals and voltage and current waveforms for the series resonant converter of FIG. 1 operating under light load conditions.

FIG. 4 illustrates gate drive signals for switching devices Q1–Q4 and Qx1–Qx4 and converter waveforms for a series resonant converter with auxiliary circuits in accordance with the present invention, such as that of FIG. 1, under light load conditions. Under light load conditions, operation of the main series resonant converter bridge is essentially the same as conventional phase-shifted PWM. At light loads, the current iLR is not sufficient to commutate nodes a and b. For that reason, the phase shift between the corresponding main and auxiliary switching devices (i.e., v(ax,a) and v(bx,b)) is introduced, as illustrated, and the currents ix1 and ix2 are increased to a level sufficient for the sum of the currents iLR and ix1 (or ix2) to provide ZVS for all the bridge switching devices.

Figure 5:
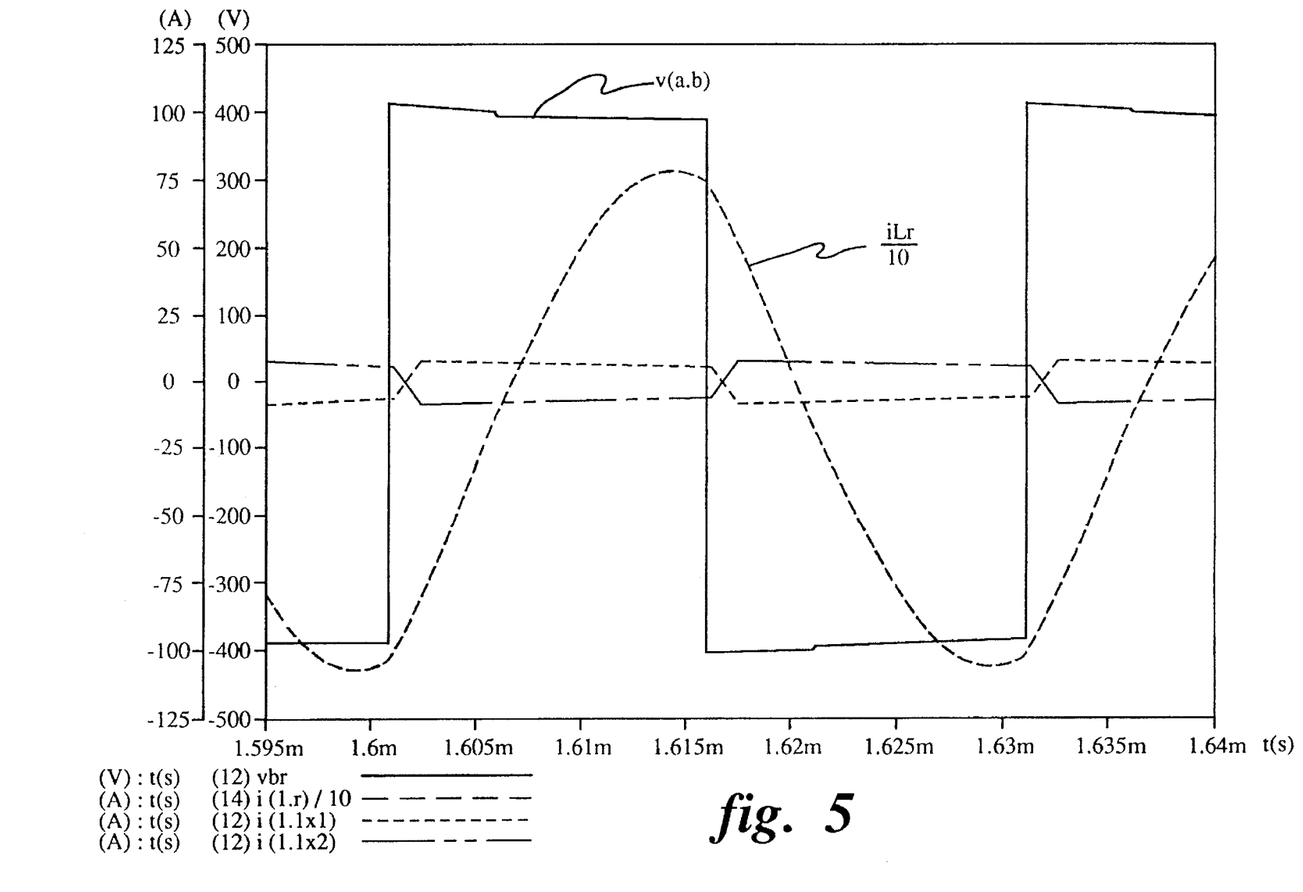
FIG. 5 illustrates simulation results for the converter of FIG. 1 operating at an input voltage of 400 V, an output voltage of 80 kV, and an output current of 1250 mA.
Figure 6:
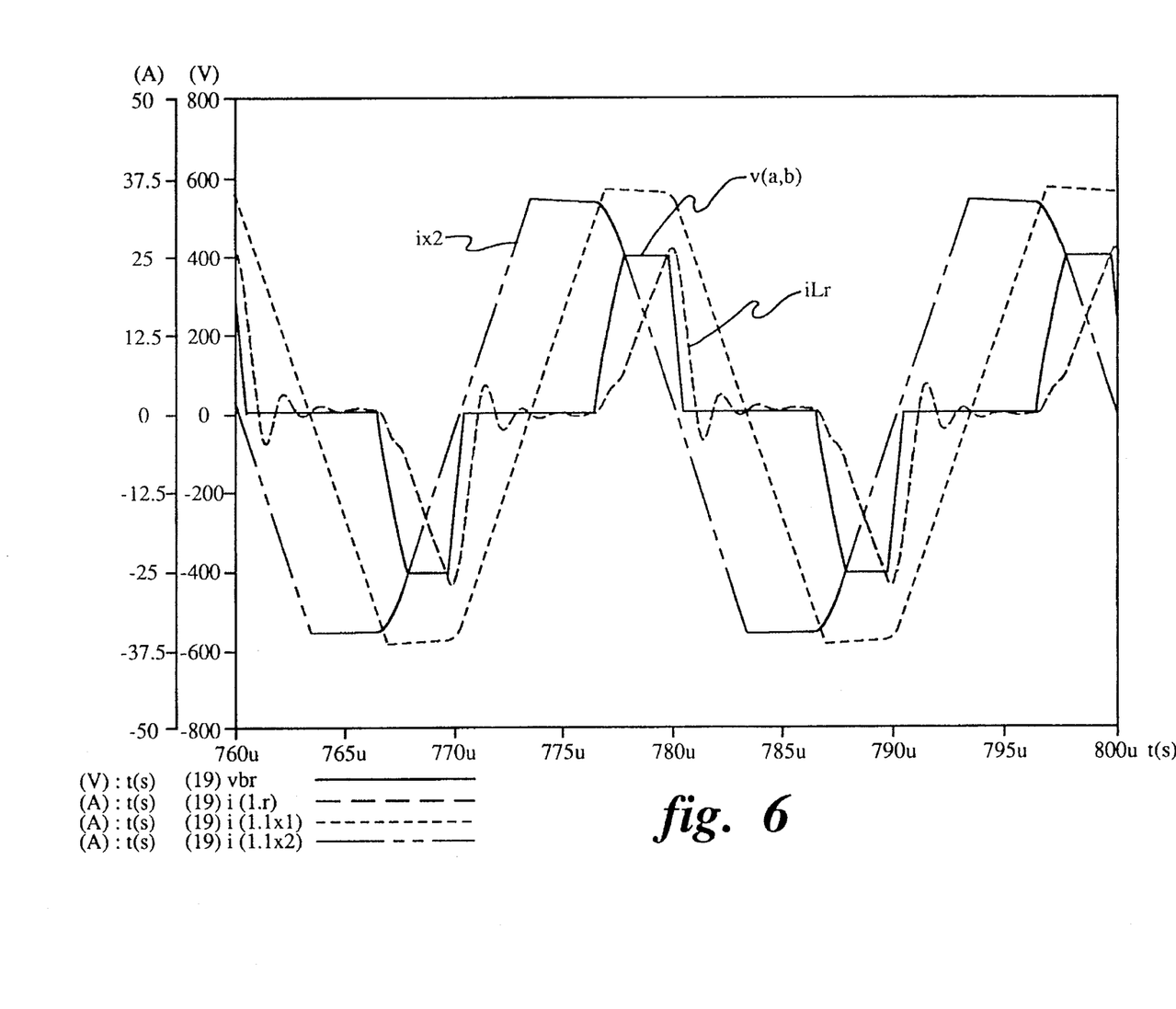
FIG. 6 illustrates simulation results for the converter of FIG. 1 operating at an input voltage of 400 V, an output voltage of 150 kV, and an output current of 10 mA.

FIG. 5 illustrates simulation results for the converter of FIG. 1 operating at an input voltage of 400 V, an output voltage of 80 kV, and an output current of 1250 mA; and FIG. 6 illustrates simulation results for the converter of FIG. 1 operating at an input voltage of 400 V, an output voltage of 150 kV, and an output current of 10 mA. For these simulation results, the parameters of a high voltage transformer were used for transformer T, including leakage inductance and winding capacitance.

Figure 7:
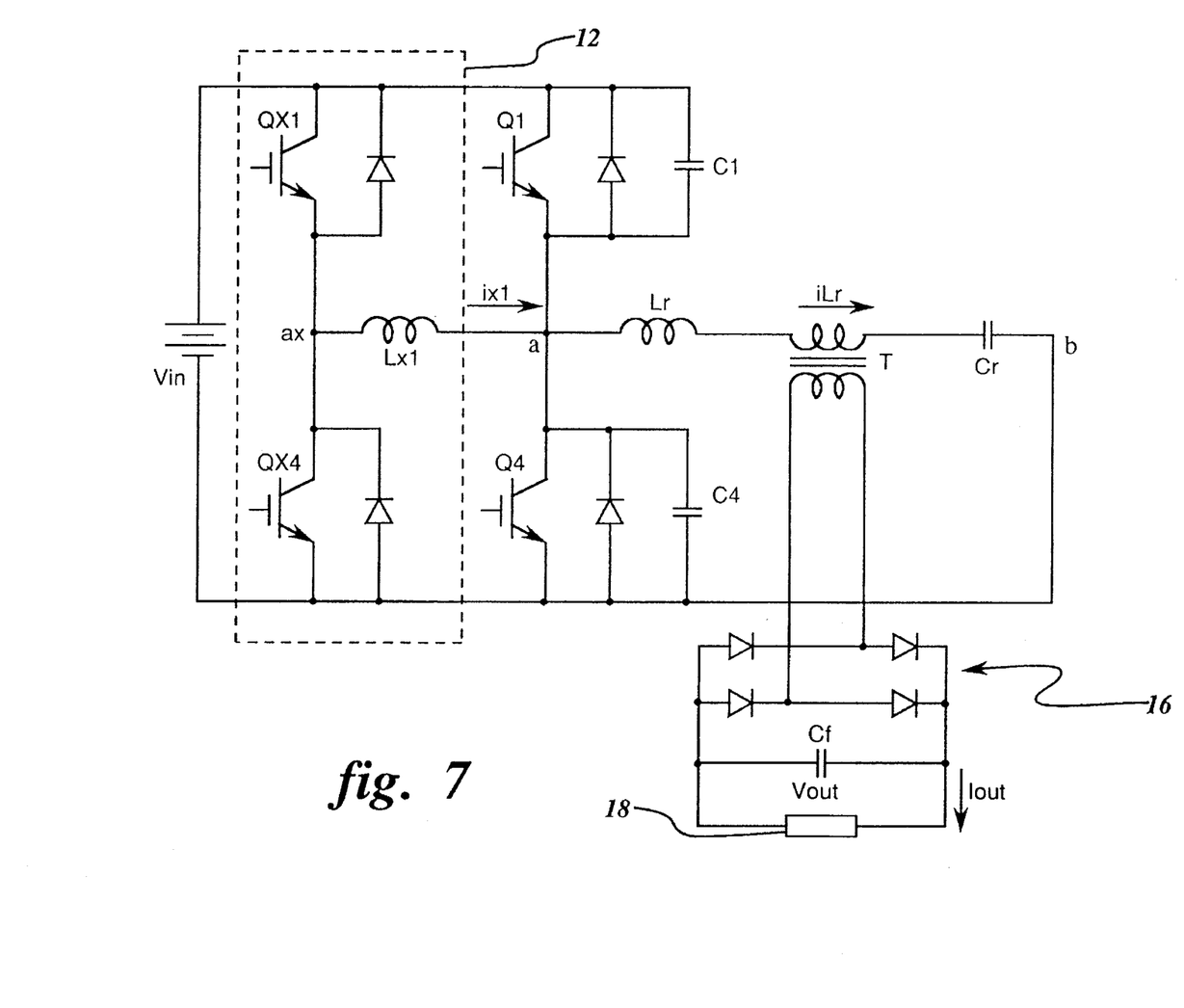
FIG. 7 schematically illustrates an alternative embodiment of a resonant converter, including a half-bridge connection of main switching devices, with auxiliary circuitry in accordance with the present invention.

FIG. 7 illustrates an alternative embodiment of a resonant converter including auxiliary circuitry according to the present invention comprising a half-bridge connection of main switching devices Q1 and Q4 and a single auxiliary half-bridge circuit with auxiliary switching devices Qx1 and Qx4. The output of the half-bridge resonant converter is controlled by frequency control, and the phase between the auxiliary switching devices and the main switching devices is varied in order to maintain ZVS at light loads.

Advantageously, a resonant converter with auxiliary circuitry in accordance with the present invention operates with high efficiency and low EMI over a wide load range, and allows phase-shifted pulse width modulation and frequency control over a wide load range without loss of ZVS capability. As an additional advantage, the control characteristics of the resonant converter are virtually unchanged.

While the preferred embodiments of the present invention have been shown and described herein, it will be obvious that such embodiments are provided by way of example only. Numerous variations, changes and substitutions will occur to those of skill in the art without departing from the invention herein. Accordingly, it is intended that the invention be limited only by the spirit and scope of the appended claims.

What is claimed is:

1. A power converter, comprising:
   a resonant converter comprising a bridge connection of main switching devices and a resonant circuit comprising a main resonant inductance and a main resonant capacitance coupled to said main switching devices; and
   an auxiliary circuit corresponding to each half-bridge of said bridge connection of main switching devices, each of said auxiliary circuits comprising a half-bridge connection of auxiliary switching devices with a junction therebetween coupled to the junction between the main switching devices of the corresponding half-bridge, each of said auxiliary circuits further comprising an auxiliary resonant inductance coupled between the junction between the auxiliary switching devices and the junction between the main switching devices of the corresponding half-bridge.

2. The power converter of claim 1 wherein said bridge connection of main switching devices comprises a full-bridge connection of said main switching devices.

3. The power converter of claim 1 wherein said bridge connection of main switching devices comprises a half-bridge connection of said main switching devices with a junction therebetween.

4. The power converter of claim 1 wherein said resonant converter comprises a series resonant converter with said main resonant inductance and said main resonant capacitance connected in series.

5. The power converter of claim 1 wherein said resonant converter comprises a parallel resonant converter with said main resonant inductance and said main resonant capacitance connected in parallel.

6. The power converter of claim 1 wherein said resonant converter comprises a series/parallel resonant converter comprising a combination of series and parallel connections of said main resonant inductance and said main resonant capacitance.

7. The power converter of claim 1 wherein current in said auxiliary resonant inductors is controlled to provide zero-voltage switching.

8. The power converter of claim 7 wherein the current in said auxiliary resonant inductors is controlled by controlling a phase shift between the corresponding main and auxiliary switching devices.

* * * * *